United States Patent [19]

Mody

[11] Patent Number: 5,290,066
[45] Date of Patent: Mar. 1, 1994

[54] MAGNETIC LABEL AND USE THEREOF

[76] Inventor: Hemant K. Mody, 200 White Rabbit Trail, Rochester, N.Y. 14612

[21] Appl. No.: 885,000

[22] Filed: May 18, 1992

Related U.S. Application Data

[63] Continuation-in-part of Ser. No. 623,672, Dec. 6, 1990, abandoned.

[51] Int. Cl.$^5$ .......................... B42D 1/00; B42D 15/00
[52] U.S. Cl. ..................... 281/15.1; 281/51; 283/67; 283/81
[58] Field of Search .............. 283/67, 81; 281/15.1, 281/51

[56] References Cited

U.S. PATENT DOCUMENTS

| | | | |
|---|---|---|---|
| 4,143,472 | 3/1979 | Murata et al. | 35/66 |
| 4,283,438 | 8/1981 | Lee | 427/47 |
| 4,417,543 | 11/1983 | Lee | 118/20 |

OTHER PUBLICATIONS

*Electronics,* "Magnetic Recording Paper is Erasable", Dale O. Ballinger, Mar. 1, 1973.

*Primary Examiner*—Paul A. Bell
*Attorney, Agent, or Firm*—Eugene Stephens & Associates

[57] ABSTRACT

In situations such as the checkout of library books and video cassettes issued by video rental stores, it is desirable to indicate the date by which these materials are due. This patent describes a method and means for displaying the due date by using an erasable and rewritable media affixed to the issuable material. Device for writing/erasing this media is described. Furthermore, method and device for simultaneous reading of bar codes, writing the due date and altering the detectability state of a programmable magnetic strip are disclosed.

20 Claims, 6 Drawing Sheets

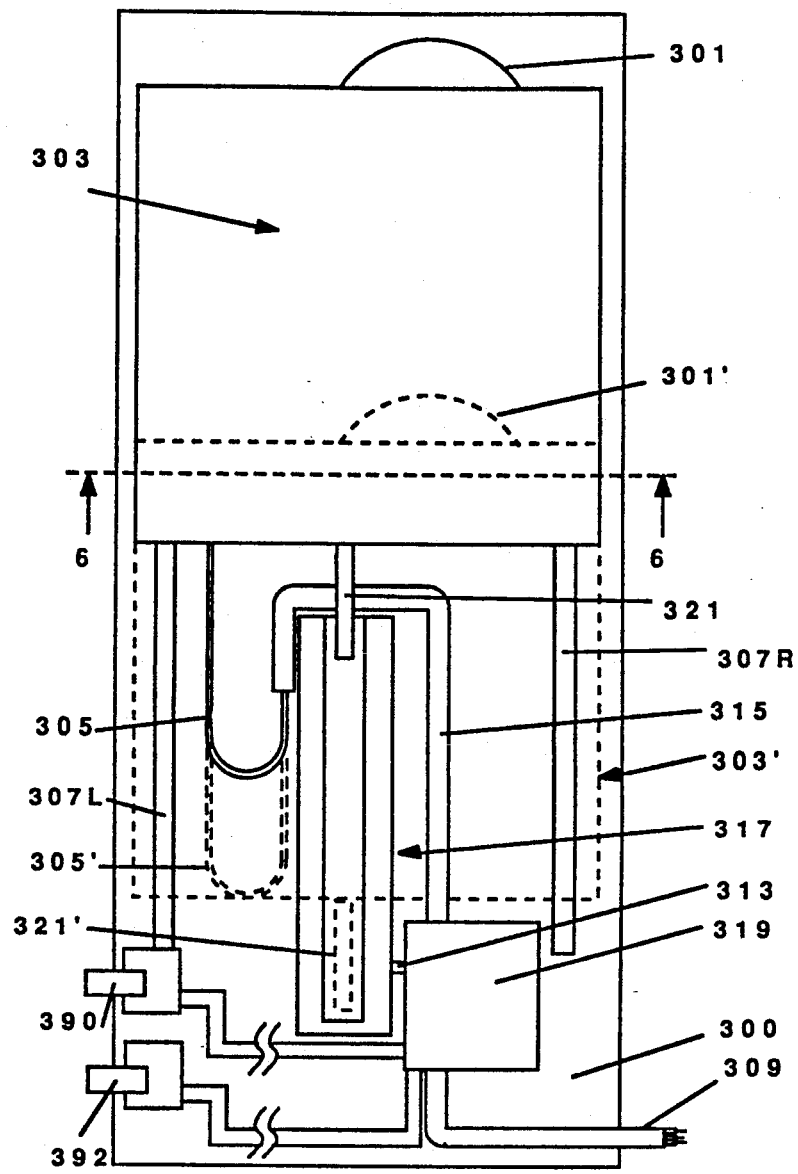
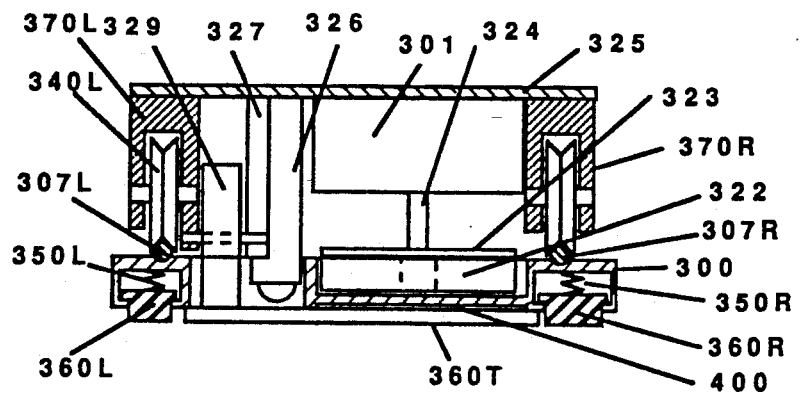

MAGNETIC LABEL AND USE THEREOF

CROSS-REFERENCE TO RELATED APPLICATIONS

This application is continuation-in-part of copending parent application Ser. No. 623,672, filed Dec. 6, 1990, entitled MAGNETIC LABEL AND USE THEREOF, and abandoned upon the filing of this continuation-in-part application. My related U.S. patent application Ser. No. 571,939, filed Aug. 23, 1990, entitled METHOD AND DEVICE FOR ERASING AND WRITING ON MAGNETIC MEDIA SUITABLE FOR DIRECT VIEWING, is incorporated herein by reference.

FIELD OF INVENTION

This invention relates to situations requiring the temporary display of information. In particular, it relates to books, tapes and other material issued or loaned by libraries and video rental stores wherein it is desirable to indicate the date by which these materials are due.

DESCRIPTION OF PRIOR ART

The checkout of library materials such as books, audio and video cassette tapes, record albums, compact disks and the like typically involves three steps after recording the patrons name:
(a) The library records the name of the item being issued.
(b) Theft prevention means are disabled.
(c) A due date is indicated on the issued material.

Upon return of the issued material, the library:
(a) Records that the material has been returned.
(b) Enables theft prevention means.
(c) Cancels the due date.

The recording of the status of issue of library material has been largely computerized. The data entry has become increasingly keyless and efficient via the use of bar code labels and bar code readers. Theft prevention is achieved by affixing a magnetic strip to the issuable material. If this magnetic strip is in one state of magnetization, an alarm is set off in the material passes through the field of detection coils.

The due date, the date by which the issued material should be returned to the library, is indicated in a variety of ways. A commonly used method is to insert in the book pocket a card on which the due date is stamped. When the book is returned, the card is removed. The card is then stamped with a new date and reused till the allocated space on the card is utilized after which the card is discarded. Another way of indicating the due date is to affix on the book a label and rubber stamp the due date on the label. When the book has to be reissued, a new label with a new due date is affixed on top of the previous one. When sufficient labels have accumulated, they are scraped off using a knife or similar implement.

Disadvantages of the due date card are:
a) The due date has to be manually stamped.
b) A book pocket must be affixed inside the book.
c) The card has to be manually inserted in each book pocket.
d) The due date card may drop out of the book.
e) The book must be opened to verify if it has been issued.
f) The book must be opened by the patron to verify due date.
g) The book checkout process is slow.

Disadvantages of the paper label are:
a) The due date must be manually stamped.
b) A new label must be affixed each time the book is checked out.
c) Labels affixed on top of each other tend to be misaligned and present an untidy look.
d) Removal of the labels is difficult.
e) Areas from which the labels are removed may have an adhesive residue which tends to accumulate dirt.
f) The book check out process is slow.

In the preceding description of prior art and its disadvantages, library books have been mentioned only as an example of the type of material and situation requiring the temporary display of information. The scope of this patent should not be construed to be limited to library books. The methods, apparatus and means for display are applicable to all materials and situations requiring an erasable and rewritable display. These include video and audio cassettes, compact disks, record albums, video game cartridges issued by libraries, video rental stores and similar establishments.

OBJECTS AND ADVANTAGES

Objects and advantages of my present invention are:
a) The use of an erasable and rewritable media to display the due date.
b) An efficient and elegant method of displaying the due date.
c) Improved productivity in the check out and return process.
d) Reduction in paper consumption.
e) To allow the simultaneous execution of the different check out/return steps.

BRIEF DESCRIPTION OF THE DRAWINGS

FIG. 5 shows the top view of the device of FIG. 4 with its cover removed.
FIG. 6 shows a cross sectional view of the check out/return device.

DETAILED DESCRIPTION OF THE PREFERRED EMBODIMENTS:

(In this description, a numeral followed by letters—L,R,B and T stands for the left, right, bottom and top member described by the numeral. When reference is made to any of these members with no particular regard to their location, the numeral is followed by an "X").

Figure 1:
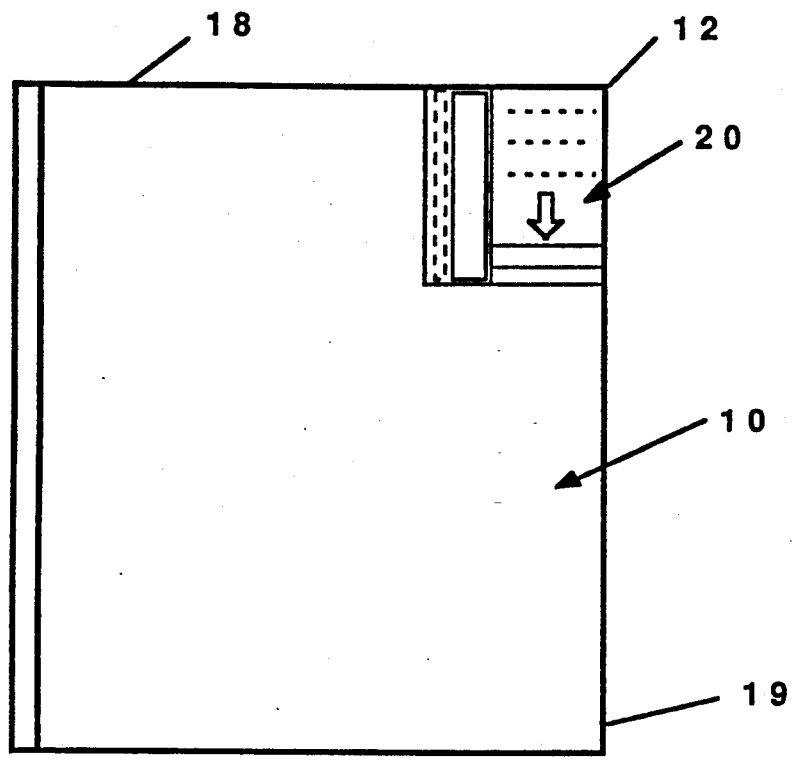
FIG. 1 shows a rectangular object with a label embodying the invention affixed in one corner.
Figure 2:
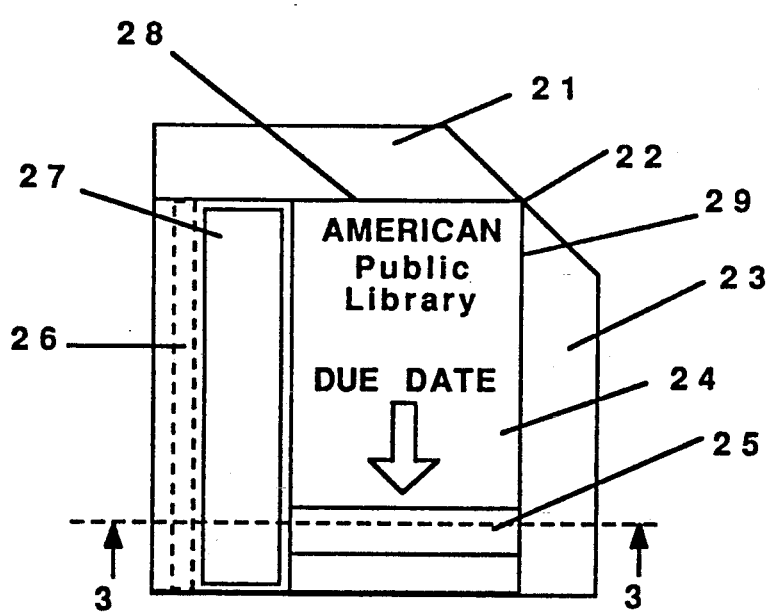
FIG. 2 shows a detailed view of the label of FIG. 1.
Figure 3:
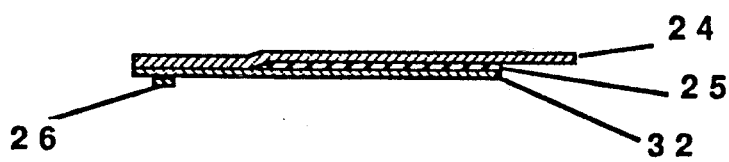
FIG. 3 shows the cross sectional view of the label of FIG. 2.

FIG. 1 shows a rectangular object 10, such as a book, record album in its jacket, a video cassette or any material having a rectagular face. At the upper right hand corner of this object is affixed a label 20, structured in accordance with a preferred embodiment of the present invention. Label 20 is shown in detail in FIGS. 2 and 3. Label 20 comprises a magnetic medium 25 suitable for direct viewing which is entrapped between a portion of an adhesive backed printed label portion 32 and protective transparent protective laminate 24. Label portion 32 carries permanently printed information, for example, naming the issuing library and an arrow drawing attention to the due date display area. A machine readable element such as a bar code, magnetic stripe, optically or magnetically readable characters carrying the serial number of the book is also permanently recorded in the region 27 as shown. On the underside of printed label portion 32, a magnetic strip 26 is affixed. The magnetization pattern on this strip can be altered and forms part of a theft prevention system which typically comprises detection coils located at the library entrance. If this strip is in one state of magnetization, an alarm is set off if the strip passes through the field of detection coils. Magnetic strip 26, its magnetization state alteration apparatus and detection/alarm system are commercially available and in widespread use in libraries and video rental stores. Manufacturers/suppliers of such magnetic strips and detection systems can be found in the book, "Book Theft and Library Security Systems", 1981–82 by Alice Harrison Bahr published by Knowledge Industry Publications Inc, White Plains, N.Y..

Magnetic media 25 is field responsive and suitable for direct viewing. A type of material suitable for this purpose comprises numerous microencapsulated flakes coated on a substrate such as paper or plastic film. This material, frequently referred to in literature as Particle Oriented Paper (POP), is commercially available from Eurand America Inc., 845 Center Drive, Vandalia, Ohio 45377. When the magnetic flakes in this media are aligned parallel to the surface on which they are coated, the media appears light since the incident light is reflected. In areas where the flakes are aligned normal to the surface, incident light is scattered and these regions appear dark. Since particle orientation can be repeatedly changed by application of magnetic field, this media is erasable and new information can be repeatedly written. More details about this material can be found in an article authored by Dale O. Ballinger and published in Electronics, Mar. 1, 1973, Copyright 1973 by McGraw-Hill Inc. 1221 Avenue of the Americas, New York, N.Y. 10020.

Method and device for erasing and writing on this media, particularly suitable for this application are described in my U.S. patent application entitled "METHOD AND DEVICE FOR ERASING AND WRITING ON MAGNETIC MEDIA SUITABLE FOR DIRECT VIEWING" dated Aug. 23, 1990 and assigned Ser. No. 07/571,939. Some of the material described herein can also be found in my above mentioned application.

Referring back to FIGS. 1, 2 and 3, protective transparent layer 24, cut in the shape shown is helpful in aligning label edges 28 and 29 to corresponding book edges 18 and 19 respectively. After placing label 20 on book 10, flaps 21 and 23 are folded around book cover. This helps in preventing the label 20 from coming off during handling and particularly when books are repeatedly inserted in and removed from book shelves. Label corner 22 is thus aligned with book corner 12. The purpose of this alignment if to facilitate the registration of media 25, machine readable element 27 and magnetic strip 26 with respect to the means for writing on media 25, reading the machine readable element 27 and altering magnetization state of strip 26, incorporated in the device to be described. Although the machine readable element can be a magnetic stripe, optically or magnetically readable characters or a printed bar code, the printed bar code offers unique advantages in the Library application since it can be printed simultaneously with the rest of the label. In the following description, only the bar code embodiment will be discussed, but it should be understood that other optically or magnetically readable data can also be used.

Figure 4:
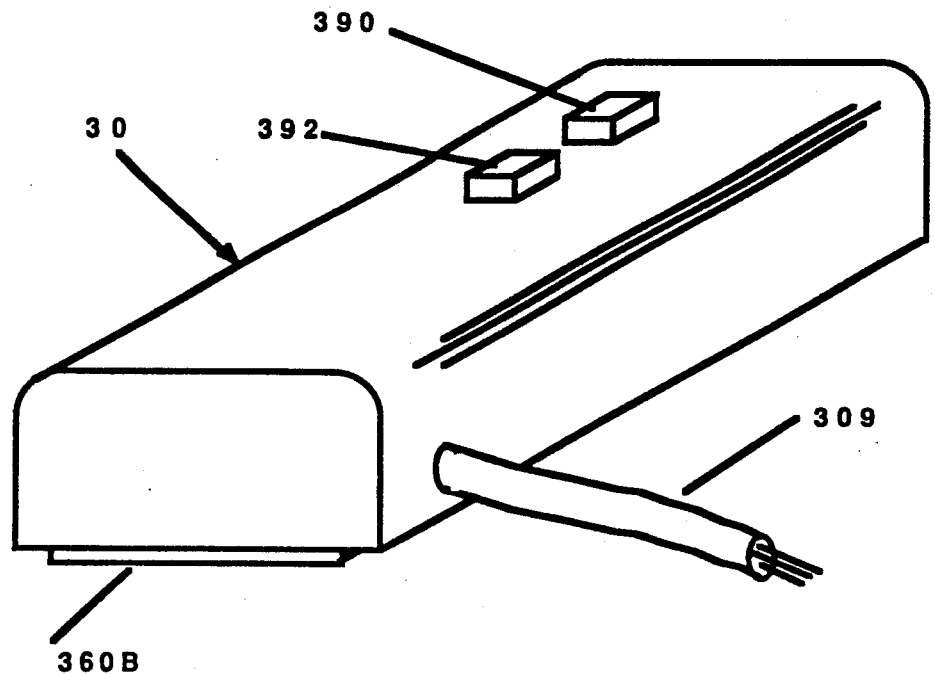
FIG. 4 shows an isometric view of a check out/return device adapted for use with the label of the invention.

FIG. 4 shows an isometric view of the device 30 designed to work with label 20. After device 30 is placed on book 10 and aligned (as described later), pressing checkout button 390 causes a due date to be written on media 25, the bar code 27 to be read and magnetic strip 26 to be desensitized. Similarly, pressing return button 392 erases due date on media 25, reads bar code 27 and sensitizes magnetic strip 26. The power supply to device 30 and data from device 30 to the host computer are carried via cable 309.

FIGS. 5, 6, 7 and 8 show different views of the various components inside device 30. Carriage subassembly 303 comprises mounting plate 325 to which are attached plastic molded parts 370L and 370R. Carriage wheels 340L, 340R, 341L and 341R are mounted in parts 370L and 370R and ride on tracks 307L and 307R so that the carriage 303 can move freely parallel to base plate 300 to position 303' and back. A multipole disk magnet 322 with its flux return plate 323 is connected to motor 301 via shaft 324. (Although a spinning axial field multipole magnet is shown as the preferred field source, other field sources such as those described in my U.S. patent application Ser. No. 07/571,939 can also be used). Motor 301 is mounted on plate 325. Also mounted on plate 325 are bar code reading optics and electronics 326, magnetization state alterating magnets 329 and 330. It will be recognized that the bar code reading optics and electronics would be replaced by a magnetic head or optical character reading optics if a magnetic stripe or optically readable characters are used instead of the bar code. Magnet 329 is a multipole radial field disk magnet mounted on a rolling pin supported on molded part 327 and 370L and can roll on label 20 region above strip 26 when device 30 is placed on label 20. Magnet 330 is an electromagnet capable of generating an alternating field to demagnetize strip 26. Magnet 330 is not shown in FIG. 6 for clarity.

The electrical connections to motor 301, power supply to and signal out from opto-electronic module 326 and electrical connections to electromagnet 330 are carried via flex cable 305. The optoelectronic module can be obtained from various bar code equipment suppliers including Welch Allyn, Industrial Products Division, Jordan Rd., Skaneateles Falls, N.Y. 13153-0187. The fixed end of cable 305 is connected to the logic and switching circuit 319 via cable 315. Electrical connections from checkout switch 390 and return switch 392 are also brought into circuit 319. Linear motor 317 is connected to carriage 303 via linkage 321 and is electrically connected to circuit 319 via cable 313. Cable 309 brings the power supply to the device and carries the data (from the bar code reader) out.

FIG. 8A shows the underside of the device. Four spring loaded members 360L, 360R, 360B and 360T are placed in rectangular cavities in base plate 300. The springs 350L and 350R backing members 360L and 360R can be seen in FIG. 6. (The springs backing members 360B and 360T are arranged in a similar way but are not shown). Magnetic stencils 601, 602, 603 and 604 comprise magnetic lettering and numerals on a nonmagnetic substrate. The magnetic lettering can be made from high permeability materials such as steel or nickel. Sheet steel 1 to 2 mils thick on a plastic substrate has been found to work well. The steel is shaped into the lettering and numerals using photochemical machining. The stencils are slideable in cavity 400 so that the due date to be written can be arranged to align with the magnetic media 25 on label 20. Numerous sliding arrangements are possible. The arrangement shown utilizes permanent magnets attached to the lower end of the slideable stencils to guide and retain the stencils. FIG. 8B shows the detailed view for two of the stencils- 602 and 604. For stencil 602, magnet 605 slides in a cavity in base plate 300 and faces a steel strip 607. The attractive force between magnet 605 and steel strip 607 helps retain the stencil. The arrangement for the other stencils is similar.

Figure 9A:
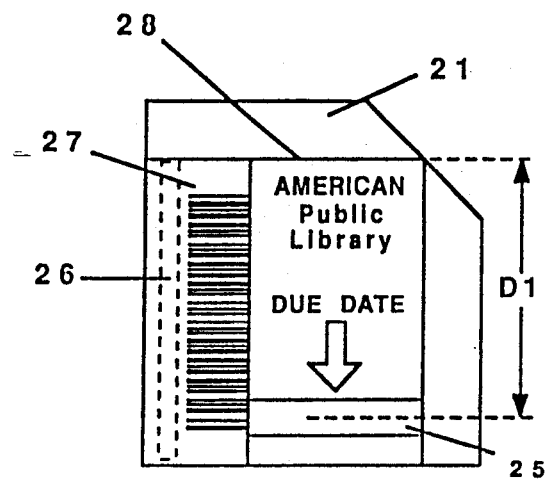
FIG. 9A and 9B show two labels with the magnetic recording media position shifted.
Figure 9B:
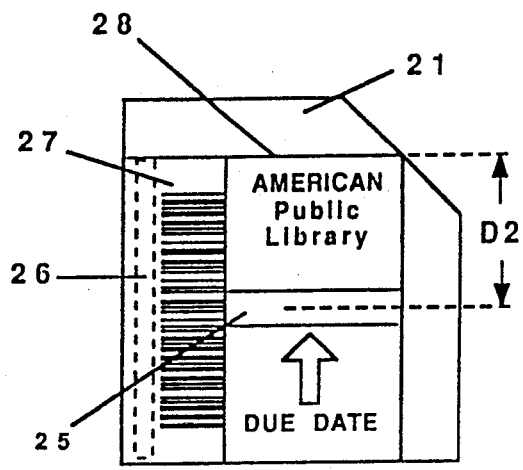
Figure 10:
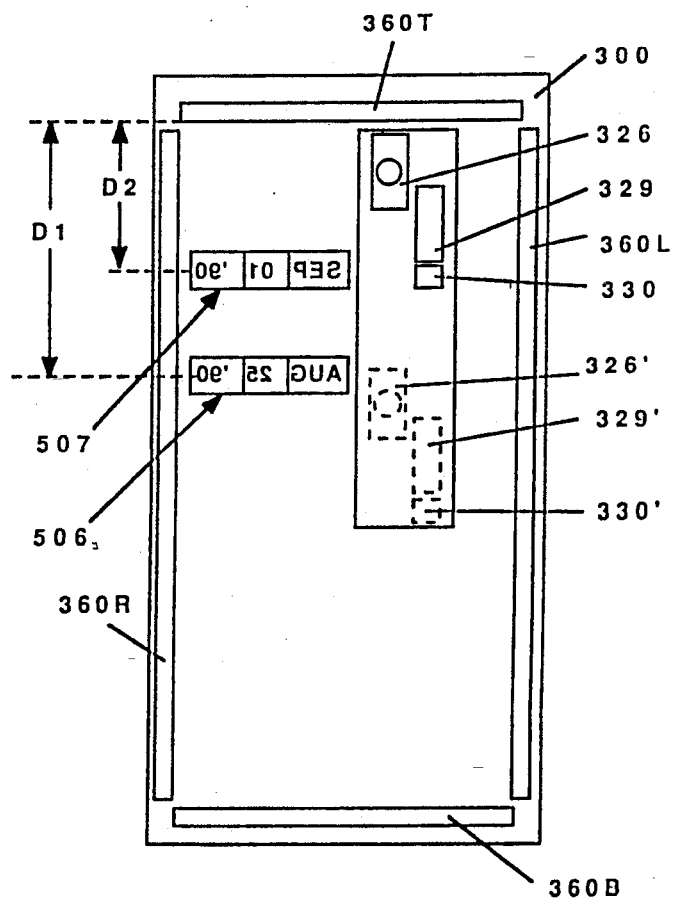
FIG. 10 shows the underside of a device suitable for writing on the labels of FIG. 9.
Figure 11:
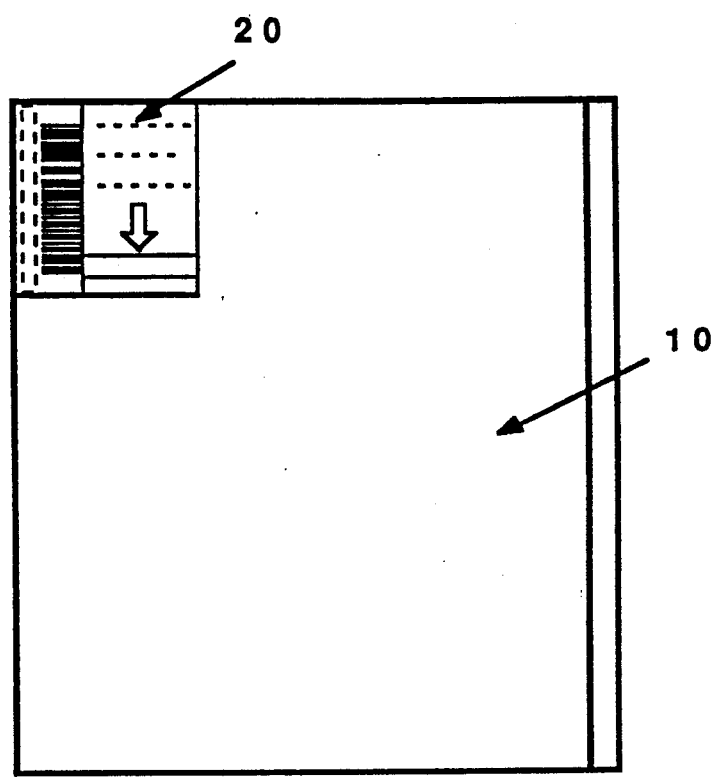
FIG. 11 shows a book with a label affixed to its upper left hand corner.

FIGS. 9A and 9B show two labels 20A and 20B similar to label 20 described earlier. The position of the magnetic media 25 is shifted in each case to correspond to the two date bearing stencils 507 and 506 as shown in FIG. 10. FIG. 10 is a view of the underside of a device otherwise identical to device 30 except that the base plate has cavities into which date stencils can be inserted. FIG. 11 shows another location for label 20, the upper left hand corner of the book back cover.

Operation:

The operation of device and the function of the various components will be explained using the example of a situation requiring the checkout of a library book. The book 10 has label 20 affixed to it as described earlier so that the location of the directly viewable magnetic media 25, the bar code 27 and the magnetic strip 26 is fixed with respect to the edges 18, 19 and corner 12 of the book. The operator (a member of the library staff) places hand held device 30 on the book such that locating bars 360B and 360L make contact with the book surface. consequently, locating bars 360 B and 360L are depressed. While pushing down on device 30, the operator slides device 30 to bring its upper right hand corner towards corner 12 of the book till the inner edges of locating bars 360T and 360R stop against book edges 18 and 19 respectively. Since both label 20 and device 30 are aligned with respect to the book edges, they are aligned with respect to each other. Thus with the magnetic stencils 601–604 positioned as shown, a high permeability pattern shaped as "AUG 05 '90" is in contact with the protective laminate 24 above media 25. The magnetic stencils as shown could be 2 mils sheet steel on a plastic substrate. The steel is etched in the month, date and year pattern as shown. Other types of magnetic stencils may be used in accordance with my U.S. patent application assigned Ser. No. 07/571,939. Also, with device 30 so placed, bar code reading means 326 is aligned with bar code 27 and sensitize/desensitize magnets 329 and 330 are aligned with magnetic strip 26.

When the operator depresses checkout button 390, logic and switching circuit 319 causes the following sequence of events to occur: Motor 301 is energized so that magnet 322 is spinning. Bar code reading means 326 is enabled and electromagnet 330 is deenergized. Linear motor 317 is energized to execute a full travel and return stroke. Thus carriage 303 travels on tracks 307X and the spinning magnet 322 passes over stencils 601–604. This causes the magnetic media 25 to experience an alternating magnetic field. This field is substantially normal in the region under the high permeability lettering while being substantially parallel elsewhere whereby the due date "AUG 05 '90" is written on media 25. Simultaneously, bar code reader scans bar code 27 (twice) while magnet 329 rolls over the label surface causing an alternate North-South pattern on strip 26. The alternate North South state is the desensitized state in this example. Thus, as stated as one of the objects of this invention, the different tasks of checkout can be accomplished in one step. Also, the due date is neatly displayed and no book pocket is required. Rubber stamps and ink pads are not needed. The label can be used numerous times and is cost effective and labor saving.

Figure 7:
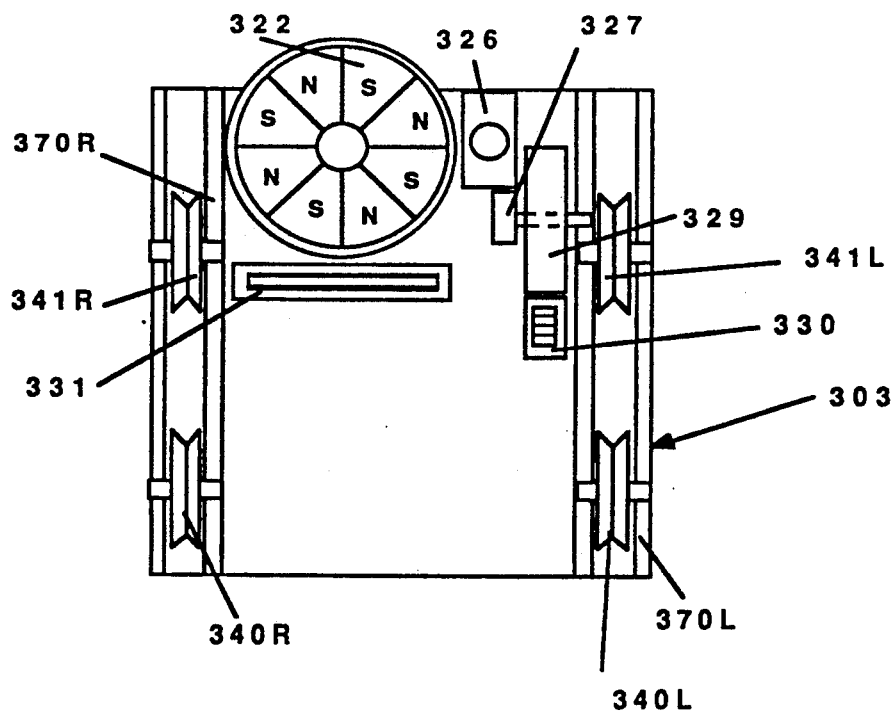
FIG. 7 is a bottom plan view of the carriage portion of the check out/return device.
Figure 8:
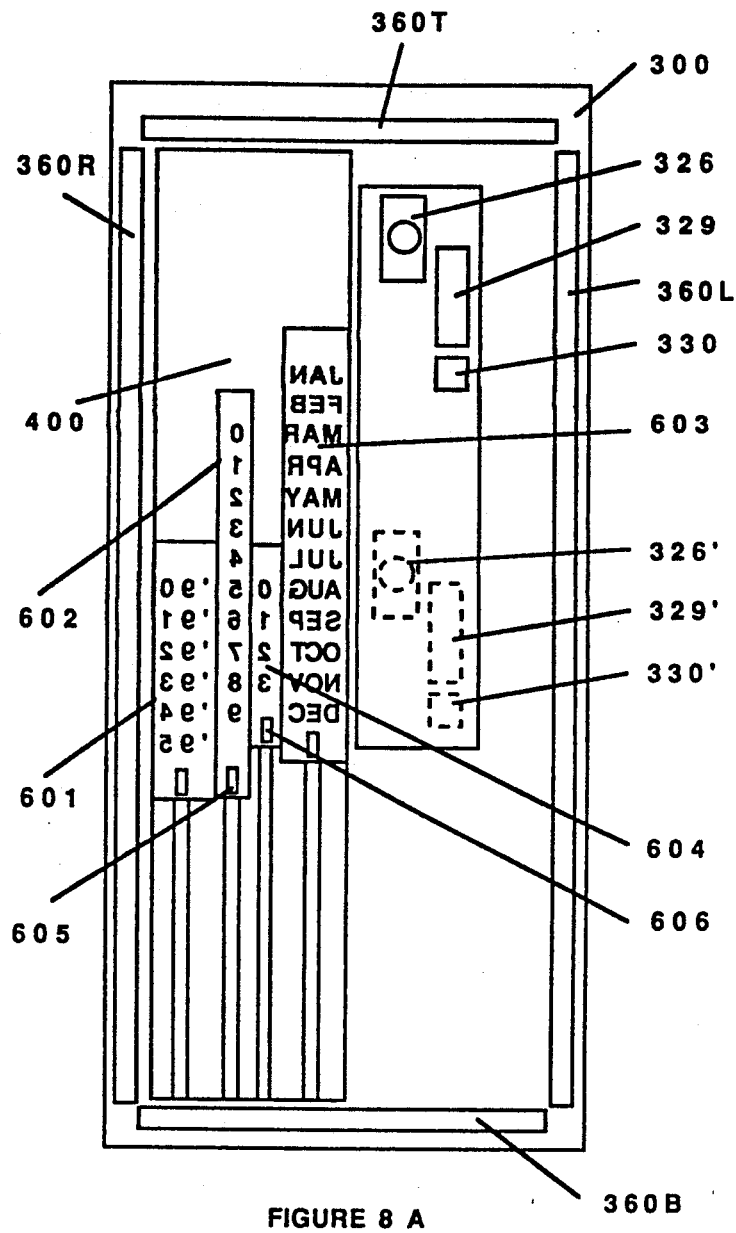
FIG. 8A shows the underside of the check out/return device.
FIG. 8B shows the guiding arrangement for two magnetic stencils.
Figure 8:
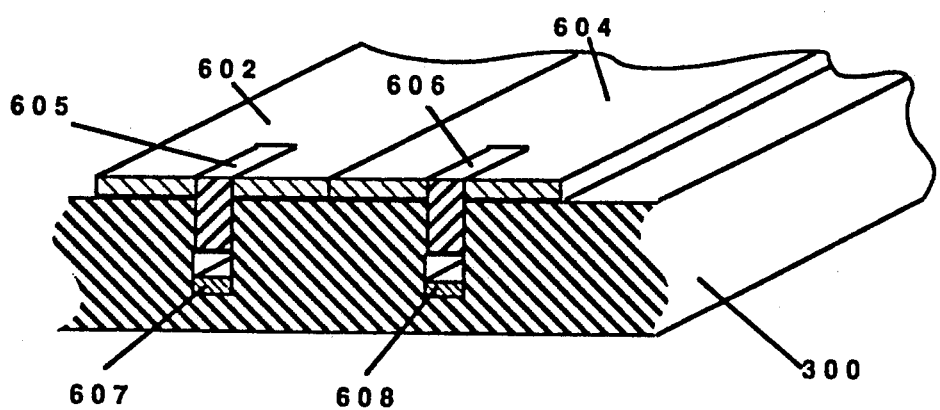

During book return, device 30 is placed on the book in the manner as already described. The operator depresses switch 392 and circuit 319 causes the following sequence of events to occur. Electromagnet 330 is energized and motor 301 turned off so that magnet 322 is not spinning. bar code reader 326 is activated. Linear motor 317 is energized and the carriage 303 traverses as before. The stationary magnet 322 erases any previously recorded information and turns media 25 dark. A still better erasure can be obtained by incorporating a separate media darkening magnet 331 as shown in FIG. 7. Magnet 331 could be an electromagnet with a high permeability core with a coil wound around it and oriented with its magnetic axis normal to the base plate 300 surface. Energising magnet 331 ensures that on the return stroke of carriage 303, media 25 experiences a field normal to its surface and thus darkens it. The magnet 331 coil can carry a direct current or preferably an alternating current. Magnet 331 could also be a permanent magnet which is brought closer to base plate 300 during book return and moved away during check out. Again, bar code reading means 326 reads bar code 27. Electromagnet 330 sensitizes strip 26. Thus the return tasks can all be accomplished in one step.

In the examples described above, the top and right hand edges of the book were used as reference or alignment edges. In some situations, placing the label as shown may cover say the book title. The user may then select, say, the upper left hand corner on the back cover to locate a label 200 as shown in FIG. 11. To align device 30, the user places device 30 on the book such that spring loaded members 360B and 360R make contact with the book surface and are thus depressed. The user then moves the upper left hand corner of device 30 towards the upper left hand corner of the book till spring loaded members 360L and 360T make contact with the left and top edges of the book. In a similar manner, by having the locating members spring loaded as described, any of the book edges can be used as reference. If however, the user decides to standardize on say the right hand corner, members 360L and 360B can be deleted and members 360R and 360T can be fixed in their projecting positions.

In some libraries and video rental stores, different materials are issued for different duration. For example, in a library, children's books may be issued for three weeks while adult books may be issued for two weeks. Similarly, a video rental store may issue new movies for one day and documentaries for three days. Clearly these requirements may be met by shifting the stencil position for each situation. One may also have seperate units like device 30 with different dates set on each device. A more elegant solution is recognized as follows: FIGS. 9A and 9B show two labels 20A and 20B with the location of magnetic media 25 shifted with respect to edge 28. FIG. 10 shows the underside of a device 30A identical to device 30 but with two sets of date stencils 506 and 507 as shown. The distance D1 of the centerline of stencil 506 from the inner edge of locating member 360T is the same as the distance (D1) of the centerline of media 25 on label 20A from reference edge 28. Similarly, distance D2 of the centerline of stencil 507 from the inner edge of locating member 360T is the same as the distance (D2) of the centerline of media 25 on label 20B from reference edge 28. Now, say there are two books 10A and 10B and book 10A is to be issued for a period which ends on due date "AUG 25 '90" which is therefore the date on stencil 506. Similarly, book 10B is to be issued till, say "SEP 01 '90", the date on stencil 507. Label 20A is affixed on book 10A and label 20B on book 10B. When device 30A is placed on book 10A and aligned as described earlier for device 30, media 25 on label 10A recieves the date "AUG 25 '90". Even though the presence of stencil 507 created field patterns capable of writing "SEP 01 '90", these fields are inconsequential since there is no media to record and display this pattern. Similarly, when device 30A is placed on book 10B bearing label 20B, the date "SEP 01 '90" is recorded. This logic can be extended to any reasonable number of dates by having more media 25 locations and corresponding stencil locations. Labels with different media 25 locations can also be color coded for easy identification.

It will be recognized that device 30 and label 20 allow various tasks to be accomplished simultaneously. If, however users require only some of the functions, the redundant components may be eliminated. Also, alternate bar code reading methods may be incorporated. To cite some examples:

(a) Some libraries and video rental stores affix permanently sensitized magnetic strips. When the material is issued in an authorized way, the patron can recieve the material by by-passing the detection coils. Thus sensitize/desensitize magnets 330 and 329 can be eliminated.

(b) Some libraries have a seperate return counter. Devices used at such counters need not be capable of writing due dates. They only need to erase them. Thus motor 301 and components 322, 323, 324 and the magnetic stencils 601–604 and 506, 507 can be eliminated.

(c) Label 20 can also be mounted inside the book, for example on the first page.

(d) Bar code reading means can also be of the laser scanning type or the CCD type. In these cases, barcode reading means need not be mounted on the moving carriage.

(e) The bar code is shown printed and optically readable. Alternate machine readable information could be optically readable characters or magnetically readable information. The reading means would then be accordingly different and are well known.

(f) It is also possible to modify device 30 to work as a desk top device. The books, tapes etc. can then be placed over it to align label 20 with the corresponding reading/writing/magnetization state altering means and the various operations carried out as described earlier.

Although the due date writing and display method described here utilizes a material with orientable microencapsulated flakes, other types of erasable media can also be used as will be apparent to one skilled in the art. For example, U.S. Pat. Nos. 4,283,438 and 4,417,543 by Lawrence L. Lee describe method and apparatus for individually encapsulating magnetic particles. A media incorporating individually encapsulated microscopic spheres, where these spheres are dark colored on one hemisphere and light colored on the other is also well suited for this application. The writing and erasing means would accordingly be modified. Another type of erasable media utilizes dark magnetic fine grain and light non-magnetic fluid as described in U.S. Pat. No. 4,143,472 by Murata et al.

Obviously, many modifications and variations of the present invention will be apparant to those skilled in the art in light of the above teachings. Therefore the present invention should be limited only by the appended claims.

What is claimed is:

1. A lending institution lendable object comprising:
   (a) said lendable object bearing a humanly readable magnetic medium;
   (b) said humanly readable magnetic medium being adapted to bear information that is changeable and related to said lendable object; and
   (c) said humanly readable magnetic medium being magnetically erasable and imagewise recordable by machine.

2. The lendable object of claim 1 wherein said magnetic medium comprises field-orientable flakes.

3. The lendable object of claim 1 including an identification code that is machine readable in a form providing keyless data entry.

4. The lendable object of claim 1 including a magnetizable member capable of being detected, when magnetized in a predetermined manner, upon passing through the field of a current carrying coil.

5. The lendable object of claim 1 having a transparent protective layer extending beyond at least one edge of said magnetic medium to facilitate positioning of said magnetic medium on said lendable object.

6. An identification element comprising:
   (a) a substrate having a first portion bearing a machine readable media of the type which includes bar codes, magnetic stripes, optically readable characters, and magnetically readable characters; and
   (b) said substrate having a second portion comprising an imagewise recordable magnetic media.

7. The identification element of claim 6 wherein said magnetic media comprises field-orientable light-reflective flakes.

8. The identification element of claim 6 having a surface bearing an adhering means.

9. The identification element of claim 6 having a surface bearing a transparent protective layer.

10. The identification element of claim 6 further comprising a magnetizable member capable of being detected, when magnetized in a predetermined manner, upon passing through the field of a current carrying coil.

11. An identification element comprising:

(a) a machine readable identification portion bearing information providing keyless data entry of an identification code;

(b) a humanly readable and variably recordable portion bearing information that is changeable;

(c) said humanly readable portion being machine erasable and recordable; and (d) said humanly readable portion comprising an imagewise recordable magnetic medium.

12. The identification element of claim 11 wherein said magnetic medium comprises field-orientable flakes.

13. The identification element of claim 11 wherein said identification code comprises a bar code.

14. A method for displaying in human readable form updateable information on an object issued by a lending establishment, said method comprising the steps of:

(a) attaching to said object an imagewise recordable magnetic media; and (b) imagewise exposing said media to a magnetic field source capable of producing visible changes in said media.

15. A method of identifying an object to be loaned for a predetermined time by a lending institution and for indicating the date by which said object is due to be returned, said method comprising the steps of:

(a) attaching to said object a label having a first portion with permanently recorded information thereon identifying said object, and an erasable second portion which is adapted to record, in human-readable form, due-date information about said object, said second portion comprising an imagewise recordable magnetic media; and (b) imagewise exposing said second portion to a magnetic field to imagewise record human readable due-date information on said second portion.

16. A label having a first portion with permanently recorded information thereon, and an erasable second portion which is adapted to record other information in human readable form, said second portion comprising an imagewise recordable magnetic media, and a selectively magnetizable member capable of being detected, when magnetized in a predetermined manner, upon passing through the field of a current-carrying coil.

17. An identification label having two portions arranged for use together by a lending establishment for identifying an object to be loaned to a borrower and to indicate a date by which the object is to be returned, said identification label comprising:

(a) a first one of said portions having object-identifying information permanently recorded in machine readable form providing keyless data entry of a machine readable identity code for said object; and (b) a second one of said portions comprising a machine erasable and recordable magnetic media adapted to magnetically record an image of date information in human-readable form when imagewise exposed to a magnetic field.

18. The identification label as defined by claim 17 wherein said magnetic media comprises magnetic field-orientable light-reflective flakes.

19. The identification label as defined by claim 17 further comprising a transparent protective member overlying said first and second portions, said transparent protective member extending beyond at least one of the edges of said first and second portions to facilitate placement of the label on said object.

20. The identification label as defined by claim 17 further comprising a selectively magnetizable member supported by at least one of said first and second portions and capable of being detected, when magnetized in a predetermined manner, upon passing through the field of a current-carrying coil.

* * * * *